United States Patent Office 3,642,817
Patented Feb. 15, 1972

3,642,817
PERFLUOROALKYLSULFONAMIDOCARBAZOLES
Joseph Kenneth Harrington, Edina, Donald C. Kvam, North Oaks, Arthur Mendel, Vadnais Heights, and Jerry E. Robertson, North Oaks, Minn., assignors to Minnesota Mining and Manufacturing Company, St. Paul, Minn.
No Drawing. Continuation-in-part of application Ser. No. 588,338, Oct. 21 1966. This application June 30, 1969, Ser. No. 837,900
Int. Cl. C07d 27/68
U.S. Cl. 260—315                              2 Claims

ABSTRACT OF THE DISCLOSURE

N-substituted perfluoroalkanesulfonamides in which the sulfonamide nitrogen substituent is selected from the group consisting of benzothiazolyl, carbazolyl and (2-aminothiazolyl) phenyl. Also included are processes for the preparation and use of said compounds. The compounds are active as anti-microbial agents and polymerization catalysts.

---

This application is a continuation-in-part of copending application Ser. No. 588,338, filed Oct. 21, 1966, now abandoned.

The invention relates to perfluoroalkanesulfonamides N-substituted by heterocyclic ring-containing groups. These compounds have activity as anti-microbial agents and polymerization catalysts.

Perfluoroalkanesulfonamides have been disclosed broadly heretofore (see, for example, U.S. Pats. 2,732,-398 and 3,321,445) but there has been no indication of any anti-microbial activity of such compounds.

In the N-substituted perfluoroalkanesulfonamides of the present invention, the sulfonamide nitrogen substituent is a heterocyclic ring-containing group selected from benzothiazolyl, carbazolyl and (2-aminothiazolyl)phenyl. The invention also includes processes for their preparation and use.

DETAILED DESCRIPTION

According to the present invention, there is provided a class of compounds consisting of perfluoroalkanesulfonamides having the general formula:

$$R_fSO_2NH\text{---}Het \qquad (I)$$

wherein $R_f$ is a perfluoroalkyl group containing one to four carbon atoms and Het is selected from benzothiazolyl, carbazolyl and (2-aminothiazolyl)phenyl.

Due to the acidity of the hydrogen of the sulfonamido group of Formula I, the compounds of the invention are catalysts for certain acid-catalyzed polymerizations, e.g. epoxide polymerizations. The compounds of the invention are anti-microbial agents, according to standard test procedures.

Preferably $R_f$ in the compounds of the invention is trifluoromethyl. Such compounds offer more efficient utilization of fluorine, since compounds containing longer fluorinated chains are more expensive but do not offer any substantial increase in anti-microbial effectiveness.

The anti-microbial activity was determined by a standard test procedure which is a variation of the original agar-plate diffusion method of Vincent and Vincent.

Leading references to the method used are: Vincent, J. G., and Vincent, Helen W., Proc. Soc. Exptl. Biol. Med. 55:162-164, 1944, and Davis, B. D., and Mingioli, E. S. Jour. Bact. 66:129-136, 1953.

Broadly speaking, the compounds of this invention are readily prepared by one or all of the following methods, each of which is illustrated by an equation.

METHOD A

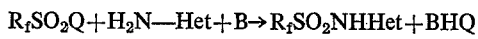

$$R_fSO_2Q + H_2N\text{---}Het + B \rightarrow R_fSO_2NHHet + BHQ$$

where Q is a halogen or perfluoroalkanesulfonate residue, B is an organic or inorganic base which acts as an acid acceptor and $R_f$ and Het are as defined above.

A solution of the appropriate primary amine and an equimolar quantity of a suitable acid acceptor (such as triethylamine, dimethylaniline, pyridine and the like) in an inert organic solvent is ordinarily used. However, an acid acceptor is not always necessary, and an excess of the primary amine may also serve as acid acceptor. Among the suitable solvents are 1,2-dimethoxyethane, benzene, chloroform, dichloromethane, dimethylacetamide, dimethylformamide and the like. Alternatively, an excess of the primary amine or the acid acceptor may serve as a solvent, or the reaction may be carried out in the absence of solvent. Generally, an equimolar quantity of the appropriate perfluoroalkanesulfonic anhydride or halide is added to the solution. The addition is advantageously carried out at −15° C. to 100° C., and for some reactants higher or lower temperatures may be preferable. In cases where the amine is of lower reactivity, it is advantageous to allow the reaction mixture to remain at reflux temperature for a few hours following addition.

The reaction of Method A may also be carried out in a high pressure reactor. This technique is particularly preferred when perfluoroalkanesulfonyl fluorides are used as reactants. These reactions are usually carried out at temperature ranges of 0 to 150° C., but these temperature ranges may be raised or lowered, depending upon the reactants used. Such reactions are most frequently carried out without solvent, or with dimethylformamide or excess triethylamine as solvent, but other advantageous variations are possible.

After completion of the reaction, the product is isolated by conventional methods. For example, the reaction mixture can be extracted with excess aqueous sodium hydroxide. The aqueous extract is then washed with organic solvents and treated with charcoal to remove impurities. Subsequent acidification of the aqueous extract with mineral acid then affords the product as an oil or solid which is distilled, sublimed, chromatographed or recrystallized as required to give pure product. When water-soluble solvents are used, the reaction mixture can be poured directly into aqueous mineral acids. The product is then isolated by conventional extraction techniques and purified as above.

METHOD B

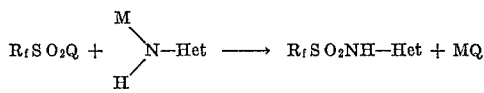

where M is an alkali metal and Q, $R_f$ and Het are as defined above.

An alkali metal salt of the appropriate amine is prepared by any of several conventional methods such as by reaction with sodium naphthalene, a metal hydride such as sodium hydride, alkoxides such as potassium t-butoxide in protic or aprotic solvents, or by reaction with an alkali metal such as sodium or potassium directly in an appropriate solvent.

The resulting salt is then treated with a perfluoroalkanesulfonyl alkylating agent such as trifluoromethanesulfonyl fluoride or chloride or trifluoromethanesulfonic anhydride, either at atmospheric pressure in open apparatus or under pressure in a pressure vessel. The reaction takes place at 0° to 150° C., depending on the reactivity of the amine and the sulfonyl halide. On completion of the reaction, the product is obtained by conventional work-up techniques as described in Method A.

$$R_fSO_2NHZ + X\text{—}Het \rightarrow R_fSO_2NH\text{—}Het + ZX$$

Formula II $R_f$ and Het are as defined above, X is halogen and Z is an alkaline earth or alkali metal. The perfluoroalkanesulfonamide salt and an appropriate halide of Formula II are reacted, generally in a suitable solvent (such as dimethylsulfoxide, dimethylformamide, 1,2 - dimethoxyethane, dimethylacetamide and the like). Heating or cooling, usually the former, may be advantageous to obtain a desirable rate of reaction.

After the completion of the reaction, the product is isolated by conventional methods. For example, when the reaction mixture is diluted with water the product may precipitate. Alternatively, the product may be extracted from the reaction mixture after dilution with water. Other recovery techniques are well known to those skilled in the art.

The reaction of Method C may be carried in a high pressure reactor.

Method C is usually most valuable when the halide is activated by suitable electron-withdrawing groups on the ring. Suitable halides for use in Method C are well known to the art, as are salts of perfluoroalkanesulfonamides.

Suitable perfluoroalkanesulfonyl anhydrides and halides (e.g. chlorides and fluorides) for use in these procedures are known to the art (thus see U.S. Pat. 2,732,398). Similarly, the amines used in producing the compounds of this invention are described in the general chemical literature or are otherwise known to those skilled in the art.

Method A, B and C are generally applicable (preferably Method A) to the preparation of compounds of the invention. However, it is sometimes preferable, in order to increase yields and minimize purification problems, to prepare certain compounds of the invention from compounds already containing the perfluoroalkylsulfonamido group by conventional procedures.

The following examples are given for the purpose of further illustrating the procedures of the present invention, but are not intended, in any way, to be limiting on the scope thereof. Thus, while the examples relate to perfluoromethanesulfonamides, other perfluorocarbon groups can be substituted in place thereof.

EXAMPLE 1

3-aminocarbazole (30 g., 0.165 mole), triethylamine (17.4 g., 0.173 mole) and chloroform (200 ml.) were stirred cold under a nitrogen atmosphere while trifluoromethanesulfonic anhydride (28.2 ml., 0.165 mole) was added slowly, maintaining the temperature below 13° C. After three hours at room temperature, the mixture was added to water (400 ml.), the layers were separated and the water layer was extracted with chloroform. The combined chloroform layers were filtered and the solvent was removed in vacuo. The solid was partially dissolved in 10 percent sodium hydroxide. The basic solution was washed with dichloromethane and acidified with concentrated hydrochloric acid. The solid product was recrystallized twice from ethanol-water to give 3-trifluoromethylsulfonamidocarbazole, M.P. 177–179° C.

*Analysis.*—Calculated for $C_{13}H_9F_3N_2O_2S$ (percent): C, 49.7; H, 2.9. Found (percent): C, 49.9; H, 2.9.

EXAMPLE 2

2 - aminobenzothiazole (37.5 g., 0.25 mole), triethylamine (25.3 g., 0.25 mole) and chloroform (250 ml.) were stirred under a nitrogen atmosphere while adding trifluoromethanesulfonic anhydride (70.5 g., 0.25 mole) slowly, the temperature being maintained below 40° C. After stirring at room temperature, the mixture was extracted with 10 percent sodium hydroxide solution. The layers were separated, and the water layer was washed with dichloromethane and acidified to pH 1 with concentrated hydrochloric acid. The solid product was collected by filtration and recrystallized twice from an ethanol-water mixture to give 2-trifluoromethylsulfonamidobenzothiazole, M.P. 253.5–255.5° C.

*Analysis.*—Calculated for $C_8H_5F_3N_2O_2S_2$ (percent): C, 34.1; H, 1.8. Found (percent): 34.3; H, 2.1.

EXAMPLE 3

To a stirred and refluxing solution of 1.52 g. (20 mmoles) of thiourea in 25 ml. of absolute ethanol was added dropwise over one hour a solution of 6.92 g. (20 mmoles) of 4-trifluoromethylsulfonamidophenacyl bromide in 50 ml. of absolute ethanol. Thereafter, the yellow solution was refluxed for two hours and concentrated to ca. 25 ml. It was chilled and diluted incrementally with ether prior to the cloud point. Continued dilution with ether and subsequent chilling yielded solid product. It was obtained as a white solid by recrystallization from acetone - ether. The pure, white solid 2-amino-4-(4-trifluoromethylsulfonamidophenyl)thiazole hydrobromide, melted at 205–207°.

*Analysis.*—Calculated for $C_{10}H_9BrF_3N_3S_2O_2$ (percent): C, 29.7; H, 2.2; F, 14.1. Found (percent): C, 28.9; H, 2.5; F, 13.5.

The 4-trifluoromethylsulfonamidophenacyl bromide was prepared by bromination of 4-acetyltrifluoromethanesulfonanilide with cupric bromide according to L. C. King and G. K. Ostrum, J. Org. Chem. 29, 3459 (1964). 4-acetyltrifluoromethanesulfonanilide was prepared from 4-aminoacetophenone according to Method A.

What is claimed is:
1. A compound of the formula

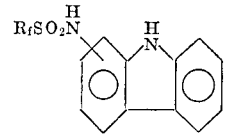

wherein $R_f$ is a perfluoroalkyl group containing one to four carbon atoms.

2. The compound 3-trifluoromethylsulfonamidocarbazole according to claim 1.

References Cited
UNITED STATES PATENTS

| | | | |
|---|---|---|---|
| 2,732,398 | 1/1956 | Brice et al. | 260—503 |
| 3,206,306 | 9/1965 | Neugebauer et al. | 260—315 |
| 3,321,445 | 5/1967 | Lozerte et al. | 260—556 F |

HENRY R. JILES, Primary Examiner

S. D. WINTERS, Assistant Examiner

U.S. Cl. X.R.

260—2 EP, 47 EP, 305, 306.8 R, 556 F; 424—270, 274

UNITED STATES PATENT OFFICE
CERTIFICATE OF CORRECTION

Patent No. 3,642,817    Dated February 15, 1972

Inventor(s) Joseph Kenneth Harrington, Donald C. Kvam, Arthur Mendel and Jerry E. Robertson It is certified that error appears in the above-identified patent and that said Letters Patent are hereby corrected as shown below:

Column 3, line 9, --Method C-- should be inserted before the formula

Column 3, line 27, "may be" should be --may also be--

Signed and sealed this 1st day of May 1973.

(SEAL)
Attest:

EDWARD M. FLETCHER, JR.          ROBERT GOTTSCHALK
Attesting Officer                 Commissioner of Patents